United States Patent
Thiel et al.

(10) Patent No.: US 7,320,525 B2
(45) Date of Patent: Jan. 22, 2008

(54) REAR-VIEW MIRROR FOR VEHICLES

(75) Inventors: Rolf Thiel, Stuttgart (DE); Volker Zipf, Plochingen (DE)

(73) Assignee: Schefenacker Vision Systems Germany GmbH, Schwaikheim (DE)

( * ) Notice: Subject to any disclaimer, the term of this patent is extended or adjusted under 35 U.S.C. 154(b) by 0 days.

(21) Appl. No.: 10/569,004

(22) PCT Filed: Aug. 5, 2004

(86) PCT No.: PCT/DE2004/001761

§ 371 (c)(1),
(2), (4) Date: Feb. 21, 2006

(87) PCT Pub. No.: WO2005/021331

PCT Pub. Date: Mar. 10, 2005

(65) Prior Publication Data

US 2006/0256441 A1   Nov. 16, 2006

(30) Foreign Application Priority Data

Aug. 21, 2003   (DE) ............................... 103 38 398

(51) Int. Cl.
*G02B 17/00* (2006.01)
*G02B 27/00* (2006.01)
(52) U.S. Cl. .................... 359/604; 359/603; 359/601
(58) Field of Classification Search ........ 359/601–615, 359/838–879
See application file for complete search history.

(56) References Cited

U.S. PATENT DOCUMENTS

| | | | |
|---|---|---|---|
| 4,505,539 A | 3/1985 | Auracher et al. ............. 385/19 |
| 4,603,946 A | 8/1986 | Kato et al. .................. 349/195 |
| 5,148,014 A * | 9/1992 | Lynam et al. ......... 250/214 AL |
| 6,359,274 B1 * | 3/2002 | Nixon et al. ............. 250/214 C |
| 7,008,090 B2 | 3/2006 | Blank .......................... 362/492 |
| 2002/0171954 A1 * | 11/2002 | Bonardi et al. ............. 359/877 |
| 2003/0043589 A1 * | 3/2003 | Blank ......................... 362/494 |

FOREIGN PATENT DOCUMENTS

| | | | | |
|---|---|---|---|---|
| EP | 705 734 | * | 4/1995 | ................. 359/604 |
| EP | 0785103 | | 7/1997 | |
| WO | WO 0055011 | | 9/2000 | |

* cited by examiner

*Primary Examiner*—Thong Q Nguyen
(74) *Attorney, Agent, or Firm*—Reising Ethington Barnes Kisselle, P.C.

(57) ABSTRACT

A rearview mirror reflects ambient light and dims when light from headlights of a following motor vehicle is detected. Electrochromic mirror glass is fixedly secured to a frame within an opening. A sensor is fixedly secured to a housing for sensing ambient light and focused or glare light directed toward the rearview mirror. A light guide is disposed between the housing and the sensor for directing the ambient light and glare light outside the housing toward the sensor. The rearview mirror also includes a switching device for periodically disrupting the transmission of the light to identify a presence of the glare light, such that the sensor creates a dimming signal upon the identification of the presence of the glare light to dim the electrochromic mirror glass. The use of the switching device minimizes the number of sensors required by using the same sensor for measuring ambient light and glare light.

9 Claims, 4 Drawing Sheets

REAR-VIEW MIRROR FOR VEHICLES

BACKGROUND ART

1. Field of the Invention

The invention relates to rearview mirrors for vehicles. More particularly, the invention relates to rearview mirrors for motor vehicles that automatically dim upon the detection of bright lights.

2. Description of the Related Art

In inner rearview mirrors of motor vehicles, the mirror housing is provided with two sensors, of which one sensor detects the glare light originating from a following motor vehicle and the other sensor detects ambient light. Both of the sensors require expensive control systems in order to darken the electro-chromatic (EC) mirror glass corresponding to the intensity of the glare light as a function of the ambient light.

SUMMARY OF THE INVENTION

A rearview mirror reflects ambient light and dims when light from headlights of a following motor vehicle is detected. The rearview mirror includes a housing including a frame that defines an opening. Electrochromic mirror glass is fixedly secured to the frame within the opening of the housing. A sensor is fixedly secured to the housing for sensing ambient light and focused or glare light directed toward the rearview mirror. A light guide is disposed between the housing and the sensor for directing the ambient light and glare light outside the housing toward the sensor. The rearview mirror also includes a switching device for periodically disrupting the transmission of the light to identify a presence of the glare light, such that the sensor creates a dimming signal upon the identification of the presence of the glare light to dim the electrochromic mirror glass.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
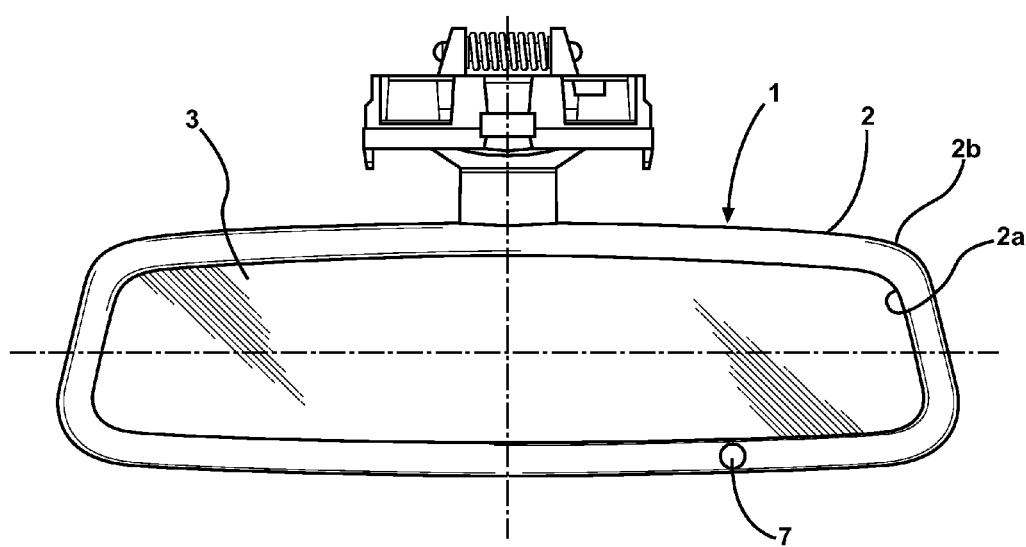
FIG. 1 is a frontal side view of a rearview mirror having a sensor incorporating the invention.

FIG. 1 illustrates an inner rearview mirror 1 of a motor vehicle (not shown). The rearview mirror 1 includes a housing 2 defining an opening 2a, in which an electrochromic (EC) mirror glass 3 is arranged. In order to prevent the driver from having an adverse reflex reaction due to light of a following vehicle impinging upon the mirror glass 3, a sensor 7 is accommodated in the mirror housing 2 and/or the frame 2b surrounding the EC mirror glass 3. The sensor 7 emits a switching signal upon the incidence of glare light. Based on the creation of the signal, the mirror glass 3 is darkened in the known manner so that the driver is not blinded. It should be appreciated by those skilled in the art that the sensor 7 can naturally be accommodated on any other location in the mirror housing 2 or even in the vehicle interior.

The sensor 7 is a photosensor, which converts the light flux impinging thereon into an electrical signal, which is used for controlling the mirror glass 3. The sensor 7 is a part of a switching device 20, which includes two light guides 8, 8'. The two guides 8, 8' merge into one another in an area 8b in front of the sensor 7. A light emission surface 14 of the merged light guides 8, 8' lies opposite to the sensor 7. The light guides 8, 8' are arranged in such a way that their respective light entrance surface 15, 16 are directed toward the back and toward the front in the direction of travel of the vehicle. The glare light 4 of the following vehicle falls on the entrance surface 15, which is directed towards the back, while the entrance surface 16 directed towards the front detects the ambient light 5. The light is fed by both the light guides 8, 8' to the sensor 7. Depending on the level of the light flux the mirror glass 3 can be darkened to a greater or lesser extent.

In order for the sensor 7 to be able to separate the glare light and the ambient light 4, 5 from one another, an optical switch 9 is arranged in the area in front of the light entrance surface 16 of the light guide 8'. Using the optical switch 9, the light entrance surface 16 can be covered, preferably periodically. Thus, the optical switch 9 acts as a chopper designed to distinguish between ambient light, i.e., noise, and the signal, i.e., glare light from the following vehicle. The sensor 7 periodically receives the light flux fed by both the light guides 8, 8' and intermittently receives the light flux fed by only the light guide 8. The sensor 7 thus can generate an electrical signal depending on the glare light 4 taking into account the ambient light 5 in order to darken the EC mirror glass 3 accordingly.

The optical switch 9 can be embodied in the known manner as a mechanical system, such as apertures, displaceable grids, rotating mirrors or the like. However, it can also be embodied as an LCD element as used in the form of displays. The switch 9 can additionally be a shutter, which is based on ferroelectric liquid crystals (FLC).

Figure 2:
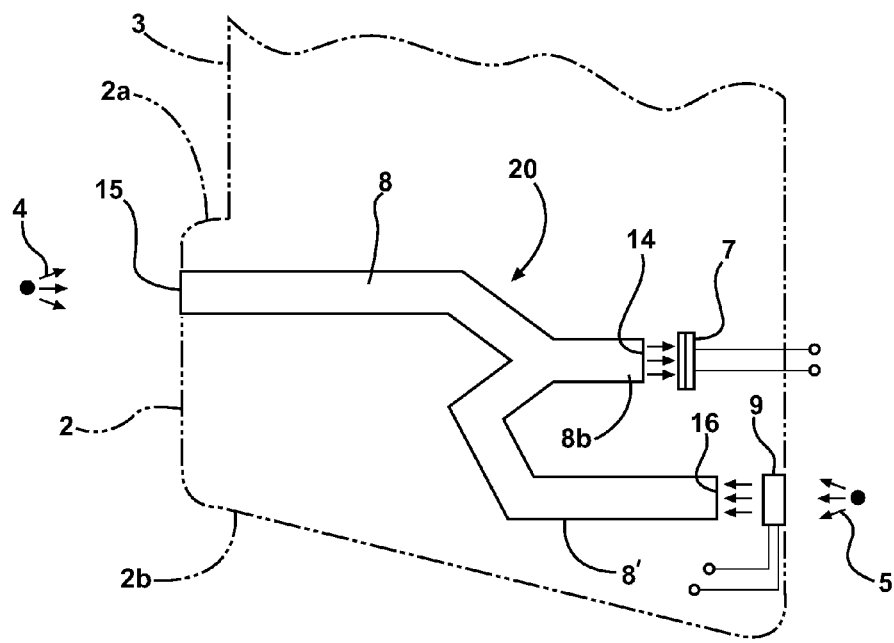
FIG. 2 is a schematic representation of a switching device of the rearview mirror shown in FIG. 1.
Figure 3:
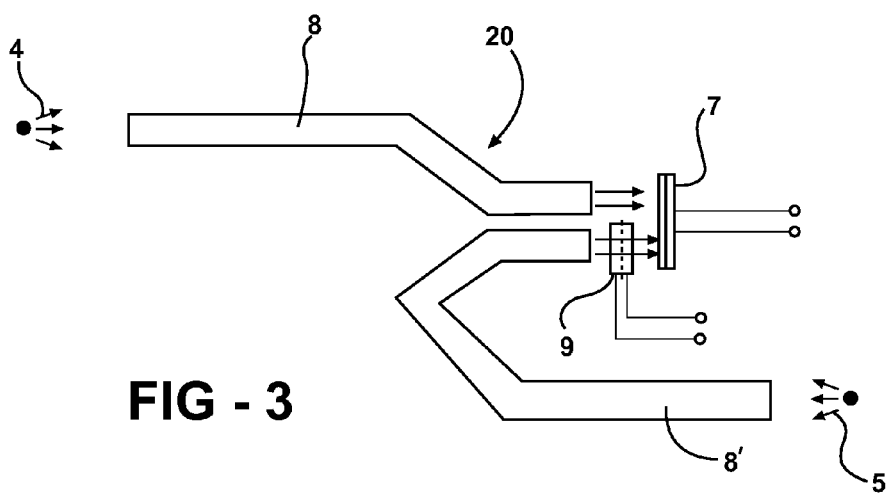
FIG. 3 is a schematic representation of a first alternative switching device of the rearview mirror shown in FIG. 1.

FIG. 3 illustrates a switching device 20, in which both the light guides 8, 8' are guided separate from one another up to the sensor 7. In contrast to the embodiment shown in FIG. 2, the optical switch 9 is not arranged in front of the light guide 8'. Instead, the optical switch 9 is located between the light guide 8' and the sensor 7. Using the optical switch 9, the ambient light 5 transmitted through the light guide 8' is allowed to pass through to or is screened off from the sensor 7 in a periodic manner. The sensor 7 thus receives the light flux fed by both the light guides 8, 8' or only the glare light 4 using the light guide 8. Accordingly, the sensor 7 generates an electrical signal, which is utilized when darkening the mirror glass 3. Using the light guides 8, 8' allows the minimization of the number of sensors 7 to one, thus reducing costs associated with inventory and assembly.

Figure 4:
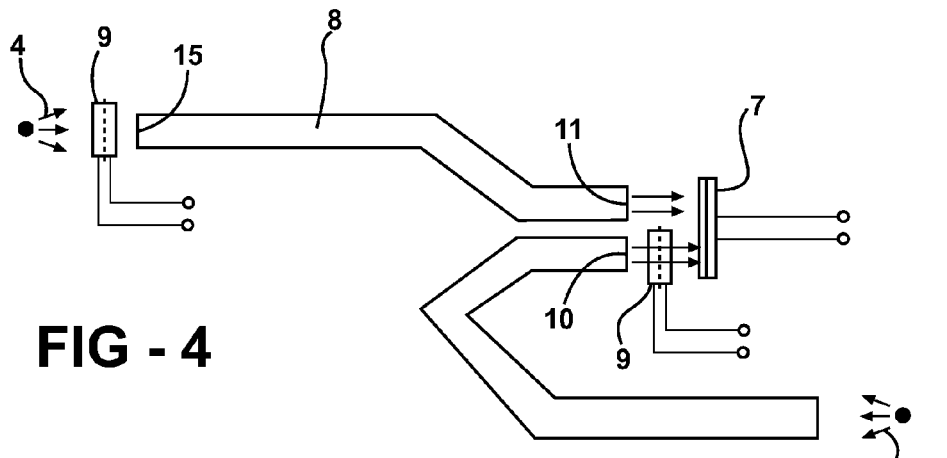
FIG. 4 is a schematic representation of a second alternative switching device of the rearview mirror shown in FIG. 1.

In the embodiment illustrated in FIG. 4, both of the light guides 8, 8' are brought up to the vicinity of the sensor 7 separate from one another. More specifically, the light guides 8, 8' provide independent paths through which the ambient light 5 must travel to reach the sensor 7. An optical switch 9 is located in each case in front of the light entrance surface 15 of the light guide 8 and between the light emission surface 10 of the light guide 8' and the sensor 7, respectively. Both the switches 9 are controlled in an alternating manner in such a way that the sensor 7 receives light only from the light guide 8 or only from the light guide 8'. The sensor 7 can accordingly darken the mirror glass 3 as a function of the glare light 4 taking into account the ambient light 5.

Naturally, as is shown in the embodiment illustrated in FIG. 2, a third optical switch 9 can also be provided in front of the light entrance surface 16 of the light guide 8'. Even other combinations of optical switches 9 are feasible. Thus for example, they can be also provided inside the light guides 8, 8' or between the light emission end 10, 11 of the light guides 8, 8' and the sensor 7.

The optical switches 9 of each switching device 20 can be different. It is, however, advantageous if the switches 9 of the switching device are similar.

In the described embodiments, the optical switches 9 are each controlled in the described manner in such a way that the light is guided by the light guides 8, 8' to the sensor 7 or the light flux is interrupted. Should the light flux be interrupted on only one light guide (FIGS. 2 and 3), the determination of the brightness of the light source is carried out by addition and/or subtraction of the sensor signal when the optical switch 9 is switched on/off. On the contrary, if separate optical switches 9 are used on both the light guides 8, 8' (FIG. 4), the brightness of both the light sources 4, 5 can be determined by an alternating toggle of the optical switches 9.

The switching frequency and, accordingly, the evaluation frequency is adjusted to the application. Thus, in an EC mirror glass, a switching frequency greater than 5 Hz is a practical frequency range to be able to detect and evaluate a change in the ambience quickly enough. In principle, the upper limit of the switching frequency can be set randomly. A low frequency cycle time is sufficient for the application in inner rearview mirrors.

Figure 6:
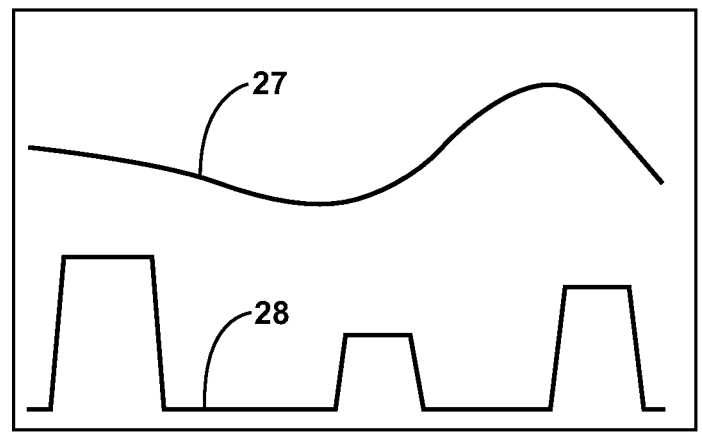
FIG. 6 is a graphic illustration of sensor voltages in case of different light sources.

Referring to FIG. 6, a voltage curve of the sensor 7 in case of incident light is shown. The upper curve 27 represents amplitudes for the ambient light, whereas the lower curve 28 represents amplitudes for the glare light 4. In case of two sensors 7, the sensor voltages would run in a comparable or similar manner.

Figure 7:
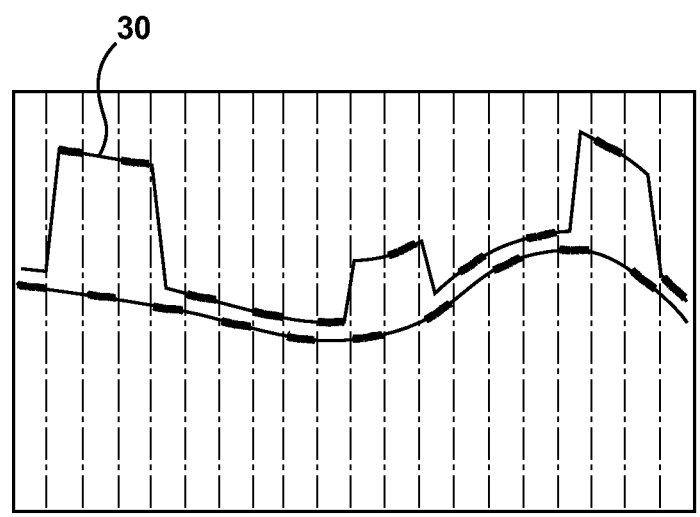
FIG. 7 is a graphic illustration of the measuring principle of the switching device.

FIG. 7 basically illustrates the gradient of the sensor signal in case of a clocked sensor. An upper line 30 represents the sensor signal if the optical switch 9 in one cycle guides both the light sources 4, 5 to the sensor 7 and if in the next cycle only one of the two light sources 4, 5 is guided to the sensor 7. By taking the difference using the signal from the preceding cycle, the brightness of the individual light sources 4, 5 can be calculated. In case of a high clock speed, the error is small, if the fluctuations of the light source take place slowly in comparison to the clock speed. If, for example, in case of an even cycle, the light of both the light sources 4, 5 is fed to the sensor 7 and in an odd cycle, only the light of the light source 4 is fed to the sensor, then the result is the brightness of the light source 5 according to the equation:

even cycle−odd cycle=light source 5.

In case of an LCD element as an optical switch 9, it is possible to use reflective, transflective or transmissive LCDs per se. In the previously described embodiments illustrated in FIGS. 2 through 4, the use of transmissive LCDs is advantageous. However, reflective LCDs are also suitable for the switches.

If a shutter is used as an optical switch 9, the shutter advantageously consists of three layers, and filters which are rotated by 90°, which polarize the light and between which an LC medium is provided as a third filter. By the electrical control of the LC medium, the light can again be rotated by 0° to 90°. The shutter can thus allow the light to pass through or can block the light passage. Due to the polarization filter the maximum transmission is approximately 50%.

Figure 5A:
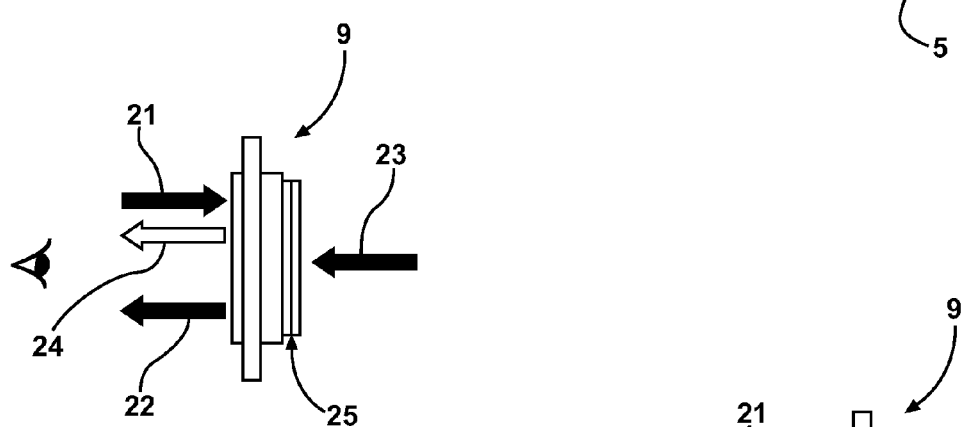
FIGS. 5a to 5c are side views of different embodiments of optical switches utilized by the invention.
Figure 5B:
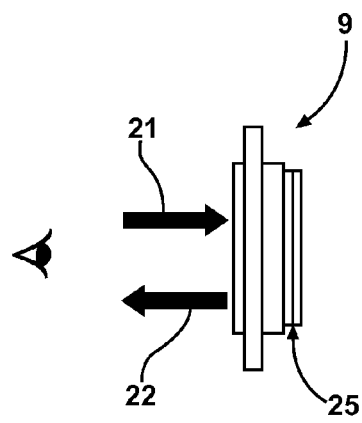
Figure 5C:
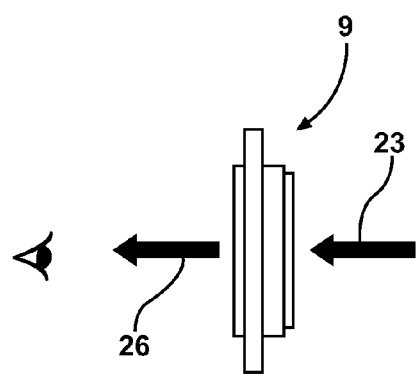

FIGS. 5a through 5c schematically illustrate different embodiments of an LCD element. The optical switch 9 in the form of an LCD element shown in FIG. 5a is embodied as a transflective LCD element. The light 21 of a light source falls from the observer's side (indicated by an eye) on the LCD element. The arrow 22 indicates the reflected light directed against the observer. The light 23 of a rear light source falls on the other side of the ICD element. The reflected light is marked with the arrow 24. The LCD element 9 additionally has a reflector 25 on its rear side.

FIG. 5b schematically illustrates a reflective LCD element. The light 21 falling from the observer's side on this LCD element 9 is reflected toward the observer (arrow 22).

FIG. 5c finally schematically illustrates a transmissive LCD element 9. The light 23 falling from the rear side on the LCD element passes through the LCD element 9 and emerges again as the transmitted light 26 on the observer's side.

Using the described arrangements the brightness of the ambient and glare lights 5 and 4, respectively, can be easily determined using only a single sensor 7 and thus an optimal darkening of the mirror glass 3 is achieved in an easy manner from the point of view of design.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A rearview mirror for reflecting ambient light, said rearview mirror comprising:
   a housing including a frame defining an opening;
   an electrochromic mirror glass fixedly secured to said frame within said opening of said housing;
   a sensor fixedly secured to said housing for sensing ambient light and glare light directed toward said rearview mirror;
   a light guide disposed between said housing and said sensor for directing the ambient light and glare light outside said housing toward said sensor; and
   a switching device for periodically disrupting the transmission of the light to identify a presence of the glare light, such that said sensor creates a dimming signal upon the identification of the presence of the glare light to dim said electrochromic mirror.

2. A rearview mirror as set forth in claim 1 wherein said light guide includes a first light guide channel and a second light guide channel.

3. A rearview mirror as set forth in claim 2 wherein said first light guide channel includes a first light entrance surface disposed adjacent and parallel to said electrochromic mirror glass.

4. A rearview mirror as set forth in claim 3 wherein said second light guide channel includes a second light entrance surface oriented away from said electrochromic mirror glass to receive the ambient light and prevent the receipt of the glare light.

5. A rearview mirror as set forth in claim 4 wherein said switching device is disposed inline and adjacent said first light entrance surface to periodically interrupt light from entering said first light guide.

6. A rearview mirror as set forth in claim 4 wherein said first light guide and said second light guide join to form a combined light guide portion.

7. A rearview mirror as set forth in claim 6 wherein said combined light guide portion is disposed adjacent said sensor.

8. A rearview mirror as set forth in claim 7 wherein said switching device is an electro-optic device that changes levels of transparency based on the amount of voltage applied thereacross.

9. A rearview mirror as set forth in claim 7 wherein said switching device is mechanically operated.

* * * * *